US010366131B2

(12) United States Patent
White et al.

(10) Patent No.: US 10,366,131 B2
(45) Date of Patent: *Jul. 30, 2019

(54) TASK COMPLETION

(71) Applicant: Microsoft Technology Licensing, LLC, Redmond, WA (US)

(72) Inventors: Ryen W. White, Woodinville, WA (US); Zijian Zheng, Bellevue, WA (US); An Yan, Sammamish, WA (US); Xiao Huang, Bothell, WA (US); Yu Wang, Atlanta, GA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 112 days.

This patent is subject to a terminal disclaimer.

(21) Appl. No.: 15/161,050

(22) Filed: May 20, 2016

(65) Prior Publication Data

US 2016/0267194 A1 Sep. 15, 2016

Related U.S. Application Data

(63) Continuation of application No. 13/916,603, filed on Jun. 13, 2013, now Pat. No. 9,378,456.
(Continued)

(51) Int. Cl.
*G06F 16/2457* (2019.01)
*G06F 16/9535* (2019.01)
(Continued)

(52) U.S. Cl.
CPC ........ *G06F 16/9535* (2019.01); *G06F 9/4856* (2013.01); *G06F 16/24578* (2019.01);
(Continued)

(58) Field of Classification Search
USPC .......................................................... 706/46
See application file for complete search history.

(56) References Cited

U.S. PATENT DOCUMENTS

| 7,653,611 B2 | 1/2010 | Zheng et al. |
| 7,802,197 B2 | 9/2010 | Lew et al. |

(Continued)

FOREIGN PATENT DOCUMENTS

| EP | 1760584 A1 | 3/2007 |
| EP | 2523110 A1 | 11/2012 |

OTHER PUBLICATIONS

ACM (DL) Digital Library Computing while charging: building a distributed computing infrastructure using smartphones, Mustafa Y. Arslan, Indrajeet Singh, Shailendra Singh, Harsha V. Madhyastha, Karthikeyan Sundaresan, Srikanth V. Krishnamurthy pp. 193-204, Nice, France—Dec. 10-13, 2012 CoNEXT '12 ACM.*
(Continued)

*Primary Examiner* — Michael B Holmes
(74) *Attorney, Agent, or Firm* — Rainier Patents, P.S.

(57) ABSTRACT

The concepts relate to task completion and specifically to aiding a user to complete an unfinished task at a subsequent time and/or on another device. One example can identify that a user is working on a task on a computing device associated with the user. In an instance when the user stops using the computing device without completing the task, the example can predict a likelihood that the user will subsequently resume the task on a second computing device associated with the user. In an instance where the likelihood exceeds a threshold, the example can attempt to aid the user in completing the task on the second computing device.

20 Claims, 8 Drawing Sheets

Related U.S. Application Data

(60) Provisional application No. 61/728,173, filed on Nov. 19, 2012.

(51) Int. Cl.

| | | |
|---|---|---|
| *G06F 16/9537* | (2019.01) | |
| *G06F 9/48* | (2006.01) | |
| *G06N 5/02* | (2006.01) | |
| *G06N 7/00* | (2006.01) | |
| *G06F 17/30* | (2006.01) | |

(52) U.S. Cl.
CPC ........... *G06F 16/9537* (2019.01); *G06N 5/02* (2013.01); *G06N 7/005* (2013.01)

(56) References Cited

U.S. PATENT DOCUMENTS

| | | | |
|---|---|---|---|
| 8,019,758 B2 | 9/2011 | Zheng et al. | |
| 8,268,864 B2* | 9/2012 | Fyrnys | A61K 31/40 |
| | | | 514/311 |
| 8,954,423 B2* | 2/2015 | Chica | G06F 17/27 |
| | | | 707/723 |
| 9,015,081 B2* | 4/2015 | Horvitz | G06F 16/957 |
| | | | 706/12 |
| 9,195,739 B2* | 11/2015 | Imig | H04L 12/1818 |
| 9,268,864 B2* | 2/2016 | White | G06F 16/24578 |
| 9,355,111 B2* | 5/2016 | He | G06F 16/901 |
| 9,378,456 B2* | 6/2016 | White | G06F 9/4856 |
| 9,449,078 B2* | 9/2016 | Wang | G06F 16/3326 |
| 9,558,240 B2* | 1/2017 | Yan | G06F 16/24537 |
| 9,600,585 B2* | 3/2017 | de la Chica | G06F 17/27 |
| 9,858,326 B2* | 1/2018 | Yan | G06F 16/25 |
| 10,037,668 B1* | 7/2018 | Desgarennes | G08B 21/0423 |
| 10,133,878 B2* | 11/2018 | Horvitz | G06F 21/6245 |
| 2007/0101001 A1 | 5/2007 | Cromer et al. | |
| 2008/0289029 A1 | 11/2008 | Kim et al. | |
| 2011/0161182 A1 | 6/2011 | Racco | |
| 2012/0011511 A1 | 1/2012 | Horvitz et al. | |
| 2014/0143196 A1 | 5/2014 | White et al. | |

OTHER PUBLICATIONS

ACM (DL) Digital Library Slow Search: Information Retrieval without Time Constraints Jaime Teevan, Kevyn Collins-Thompson, Ryen W. White, Susan T. Dumais, Yubin Kim Vancouver BC, Canada—Oct. 3-4, 2013, pp. 1-10, HCIR '13 ACM.*

IEEE The human experience [of ubiquitous computing] G.D. Abowd; E.D. Mynatt; T. Rodden Published in: IEEE Pervasive Computing ( vol.: 1 , Issue: 1 , Jan.-Mar. 2002) pp.: 48-57 dated Aug. 7, 2002.*

ACM Digital Library Toward a unified theory of the multitasking continuum: from concurrent performance to task switching, interruption, and resumption Dario D. Salvucci Niels A. Taatgen Jelmer P. Borst CHI '09 Proceedings of the SIGCHI Conference on Human Factors in Computing Systems pp. 1819-1828 2009 ACM.*

ScienceDirect Elsevier International Journal of Human-Computer Studies vol. 58, Issue 5, May 2003, pp. 583-603 Preparing to resume an interrupted task: effects of prospective goal encoding and retrospective rehearsal J.Gregory Trafton, Erik M Altmann, Derek P Brock, Farilee E Mintz.*

ACM Digital Librqary Understanding and Supporting Cross-Device Web Search for Exploratory Tasks with Mobile Touch Interactions Shuguang Han Zhen Yue Daqing He ACM Transactions on Information Systems (TOIS) TOIS Homepage archive vol. 33 Issue 4, May 2015 Article No. 16 pp. 1-34.*

Koester et al., "Modeling the Speed of Text Entry with a Word Prediction Interface", Proceedings of the IEEE Transactions on Rehabilitation Engineering, vol. 2, No. 3, pp. 177-187, 11 pages.

Non-Final Office Action dated May 26, 2015 from U.S. Appl. No. 13/916,603, 23 pages.

Response dated Sep. 1, 2015 to the Non-Final Office Action dated May 26, 2015 from U.S. Appl. No. 13/916,603, 13 pages.

Final Office Action dated Jan. 14, 2016 from U.S. Appl. No. 13/916,603, 36 pages.

Response dated Mar. 14, 2016 to the Final Office Action dated Jan. 14, 2016 from U.S. Appl. No. 13/916,603, 11 pages.

Notice of Allowance dated Apr. 1, 2016 from U.S. Appl. No. 13/916,603, 10 pages.

International Search Report and Written Opinion dated Feb. 17, 2014 from PCT Patent Application No. PCT/US2013/070617, 10 pages.

International Preliminary Report on Patentability dated May 28, 2015 from PCT Patent Application No. PCT/US2013/070617, 7 pages.

U.S. Appl. No. 61/728,173 titled "Search Transitions" filed Nov. 19, 2012 by inventors White et al., 39 pages.

Chang et al., "Deep Shot: A Framework for Migrating Tasks Across Devices Using Mobile Phone Cameras", SIGCHI Conference on Human Factors in Computing Systems, May 7-12, 2011, Vancouver, B.C., Canada, 10 pages.

Sohn et al., "Myngle: Unifying and Filtering Web Content for Unplanned Access Between Multiple Personal Devices", Proceedings of the 13th International Conference on Ubiquitous Computing, Sep. 17-21, 2011, Beijing, China, pp. 257-266, 10 pages.

Ghiani et al., "Push and Pull of Web User Interfaces in Multi-Device Environments", International Working Conference on Advanced Visual Interfaces, May 21-25, 2012, Capri Island, Italy, 8 pages.

Sohn et al., "Enabling Cross-Device Interaction with Web History", CHI '10 Extended Abstracts on Human Factors in Computing Systems, Apr. 14-15, 2010, Atlanta, GA, pp. 3883-3888, 6 pages.

Wiltse et al., "PlayByPlay: Collaborative Web Browsing for Desktop and Mobile Devices", SIGCHI Conference on Human Factors in Computing Systems, Apr. 8, 2009, Boston, MA, pp. 1781-1790,10 pages.

Prante et al., "Exploiting Context Histories: A Cross-Tool and Cross-Device Approach to Reduce Compartmentalization when Going Back", Proceedings of Informatik, Ulm, Sep. 20-24, 2004, pp. 314-318, 5 pages.

Tungare et al., "Continuous Uls for Seamless Task Migration in MultiPlafform Uls: Bridging Task Disconnects", Proceedings of the Eleventh IFIP TC13 International Conference on Human-Computer Interaction (INTERACT ), Sep. 10, 2007, 8 pages.

Agichtein et al., "Improving Web Search Ranking by Incorporating User Behavior Information", Proceedings of the 29th Annual International ACM SIGIR Conference on Research and Development in Information Retrieval, Aug. 6-11, 2006, Seattle, WA, 8 pages.

Agichtein et al., "Search, Interrupted: Understanding and Predicting Search Task Continuation", Proceedings of the 35th International ACM SIGIR Conference on Research and Development in Information Retrieval, Aug. 12-16, 2012, Portland, OR, 10 pages.

Aiello et al., "Behavior-driven Clustering of Queries into Topics", Proceedings of the 20th ACM International Conference on Information and Knowledge Management, Oct. 24-28, 2011, Glasgow, Scotland, UK, pp. 1373-1382, 10 pages.

Aula et al., "Information Search and Re-access Strategies of Experienced Web Users", Proceedings of the 14th International Conference on World Wide Web, May 2005, Chiba, Japan, pp. 583-592, 10 pages.

Bennett et al., "Modeling the Impact of Short- and Long-Term Behavior on Search Personalization", Proceedings of the 35th International ACM SIGIR Conference on Research and Development in Information Retrieval, Aug. 12-16, 2012, Portland, OR, 10 pages.

Cao et al., "Context-Aware Query Suggestion by Mining Click-Through and Session Data", Proceedings of the 14th ACM SIGKDD International Conference on Knowledge Discovery and Data Mining, Aug. 24-27, 2008, Las Vegas, NV, 9 pages.

Church et al., "Understanding the Intent behind Mobile Information Needs", Proceedings of the 14th International Conference on Intelligent User Interfaces, Feb. 8-11, 2009, Sanibel Island, FL, pp. 247-256, 10 pages.

"Digital Omnivores: How Tablets, Smartphones and Connected Devices are Changing US Digital Media Consumption Habits", Oct. 2011, retrieved at <<http://www.ipmark.com/pdf/Omnivoros.pdf>>, 33 pages.

(56) References Cited

OTHER PUBLICATIONS

Dearman et al., "'It's on my other computer!": Computing with Multiple Devices", Proceedings of the SIGCHI Conference on Human Factors in Computing Systems, Apr. 5-10, 2008, Florence, Italy, 10 pages.
Donato et al., "Do you want to Take Notes? Identifying Research Missions in Yahoo! Search Pad", Proceedings of the 19th International Conference on World Wide Web, Apr. 26-30, 2010, Raleigh, N, pp. 321-330, 10 pages.
Friedman et al., "Additive Logistic Regression: a Statistical View of Boosting", Aug. 20, 1998, retrieved at <<http://www-connex.lip6.fr/~amini/RelatedWorks/Has99.pdf>>, Technical Report, 45 pages.
Henze et al., "Observational and Experimental Investigation of Typing Behavior using Virtual Keyboards on Mobile Devices", Proceedings of the SIGCHI Conference on Human Factors in Computing Systems, May 5-10, 2012, Austin, TX, 10 pages.
Jones et al., "Beyond the Session Timeout: Automatic Hierarchical Segmentation of Search Topics in Query Logs", Proceedings of the 17th ACM Conference on Information and Knowledge Management, Oct. 26-30, 2008, Napa Valley, Ca, 10 pages.
Kamvar et al., "A Large Scale Study of Wireless Search Behavior: Google Mobile Search", Proceedings of the SIGCHI Conference on Human Factors in Computing Systems, Apr. 22-27, 2006, Montreal, Quebec, Canada, 9 pages.
Kamvar et al., "Computers and iPhones and Mobile Phones, oh my!: A logs-based comparison of search users on different devices", Proceedings of the 18th International Conference on World Wide Web, Apr. 20-24, 2009, Madrid, Spain, 10 pages.
Kane et al., "Exploring Cross-Device Web Use on PCs and Mobile Devices", Proceedings of the 12th IFIP TC 13 International Conference on Human-Computer Interaction, Aug. 8-24, 2009, 14 pages.
Karlson et al., "Mobile Taskflow in Context: A Screenshot Study of Smartphone Usage", Proceedings of the SIGCHI Conference on Human Factors in Computing Systems, Apr. 10-15, 2010, Atlanta, GA, pp. 2009-2018,10 pages.
Karlson et al., "Working Overtime: Patterns of Smartphone and PC Usage in the Day of an Information Worker", Proceedings of the 7th International Conference on Pervasive Computing, May 2009, Redmond, WA, 8 pages.
Kellar et al., "A Field Study Characterizing Web-based Information Seeking Tasks", Journal of the American Society for Information Science and Technology, Jan. 15, 2005, Nova Scotia, Canada, 35 pages.
Kotov et al., "Modeling and Analysis of Cross-Session Search Tasks", Proceedings of the 34th International ACM SIGIR Conference on Research and Development in Information Retrieval, Jul. 24-28, 2011, Beijing, China, 10 pages.
Li et al., "Good Abandonment in Mobile and PC Internet Search", Proceedings of the 32nd International ACM SIGIR Conference on Research and Development in Information Retrieval, Jul. 19-23, 2009, Boston, MA, 8 pages.
Lieberman et al., "Exploring the Web with Reconnaissance Agents", Communications of the ACM, Aug. 2001, vol. 44, No. 8, pp. 69-75, 7 pages.
Liu et al., "Personalizing Information Retrieval for Multi-Session Tasks: The Roles of Task Stage and Task Type", Proceedings of the 33rd International ACM SIGIR Conference on Research and Development in Information Retrieval, Jul. 19-23, 2010, Geneva, Switzerland, 8 pages.
Mackay et al., "Exploring Multi-session Web Tasks", Proceedings of the SIGCHI Conference on Human Factors in Computing Systems, Apr. 5-10, 2008, Florence, Italy, pp. 1187-1196, 10 pages.

Mei et al., "An Analysis Framework for Search Sequences", Proceedings of the 18th ACM Conference on Information and Knowledge Management, Nov. 2-6, 2009, Hong Kong, China, pp. 1991-1996, 6 pages.
Morris et al., "SearchBar: A Search-Centric Web History for Task Resumption and Information Re-Finding", Proceedings of the SIGCHI Conference on Human Factors in Computing Systems, Apr. 5-10, 2008, Florence, Italy, 10 pages.
Singla et al., "Studying Trailfinding Algorithms for Enhanced Web Search", Proceedings of the 33rd International ACM SIGIR Conference on Research and Development in Information Retrieval, Jul. 19-23, 2010, Geneva, Switzerland, pp. 443-450, 8 pages.
Spink, et al., "From E-sex to E-commerce: Web Search Changes", IEEE Computer, vol. 35, Issue 3, Mar. 2002, pp. 107-109, 3 pages.
Teevan et al., "Information Re-Retrieval: Repeat Queries in Yahoo's Logs", Proceedings of the 30th Annual International ACM SIGIR Conference on Research and Development in Information Retrieval, Jul. 23-27, 2007, Amsterdam, The Netherlands, 8 pages.
Teevan et al., "The Perfect Search Engine Is Not Enough: A Study of Orienteering Behavior in Directed Search", Proceedings of the SIGCHI Conference on Human Factors in Computing Systems, vol. 6, No. 1, Apr. 24-29, 2004, Vienna, Austria, pp. 415-422, 8 pages.
Teevan et al., "Understanding the Importance of Location, Time, and People in Mobile Local Search Behavior", Proceedings of the 13th International Conference on Human Computer Interaction with Mobile Devices and Services, Aug. 30-Sep. 2, 2011, Stockholm, Sweden, 4 pages.
Yi et al., "Deciphering Mobile Search Patterns: A Study of Yahoo! Mobile Search Queries", Proceedings of the 17th International Conference on World Wide Web, Apr. 21-25, 2008, Beijing, China, pp. 257-266, 10 pages.
White et al., "Investigating Behavioral Variability in Web Search", Proceedings of the 16th International Conference on World Wide Web, May 8-12, 2007, Banff, Alberta, Canada, pp. 21-30, 10 pages.
White et al., "Predicting Short-Term Interests Using Activity-Based Search Context", Proceedings of the 19th ACM International Conference on Information and Knowledge Management, Oct. 26-30, 2010, Toronto, Ontario, Canada, pp. 1009-1018, 10 pages.
Wang et al., "Characterizing and Supporting Cross Device Search Tasks", ACM, WSDM'13, Feb. 6-8, Rome, Italy, 10 pages.
Li et al., "A faceted approach to conceptualizing tasks in information seeking", Information Processing and Management, 44, 2008, pp. 1822-1837, 16 pages.
Sousa et al., "Aura: An Architectural Framework for User Mobility in Ubiquitous Computing Environments", Proceedings of the 3rd Working IEEE/IFIP Conference on Software Architecture, Aug. 2002, 15 pages.
Sterling, Greg, "Google Enables Cross-Platform Local Search (As Carrot to Relinquish Your Privacy)", Mar. 5, 2012, retrieved at <<http://searchengineland.com/google-enables-cross-platform-local-search-as-carrot-for-web-history-113811>> on Apr. 24, 2015, 8 pages.
Chiarandini et al., "Discovering Social Photo Navigation Patterns", Proceedings of the IEEE International Conference on Multimedia and Expo, 2012, pp. 31-36, 6 pages.
Au et al., "A Novel Evolutionary Data Mining Algorithm With Applications to Churn Prediction", Proceedings of the IEEE Transactions on Evolutionary Computation, vol. 7, No. 6, Dec. 2003, pp. 532-545, 14 pages.
Bing et al., "Efficient Algorithms for Calculating Euclidean Distance Spectra of Multi-User Continuous Phase Modulation Systems", Proceedings of the IEEE International Symposium on Information Theory, 2012, pp. 2391-2395, 5 pages.

\* cited by examiner

TASK COMPLETION

BACKGROUND

Users often utilize computers to accomplish tasks, such as search tasks or document completion tasks. In many cases, the user starts and completes the tasks in a given computing scenario. However, in other cases, the user is unable to complete the task in the given computing scenario. The present description relates to aiding the users in the latter cases.

SUMMARY

The described implementations relate to task completion. In some cases a user can work on a task on a computing device associated with the user. The user may stop using the computing device without completing the task. In such a case, one application can predict that the user will subsequently resume the task on a second computing device associated with the user. The application can cause the task to be automatically presented to the user on the second computing device. The application can further predict actions that the user will take to complete the task. The further prediction can be based upon user interactions on prior tasks. The application can take individual actions on behalf of the user to assist the user in completing the task.

The above listed example is intended to provide a quick reference to aid the reader and is not intended to define the scope of the concepts described herein.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced.

DETAILED DESCRIPTION

Overview

Figure 1:
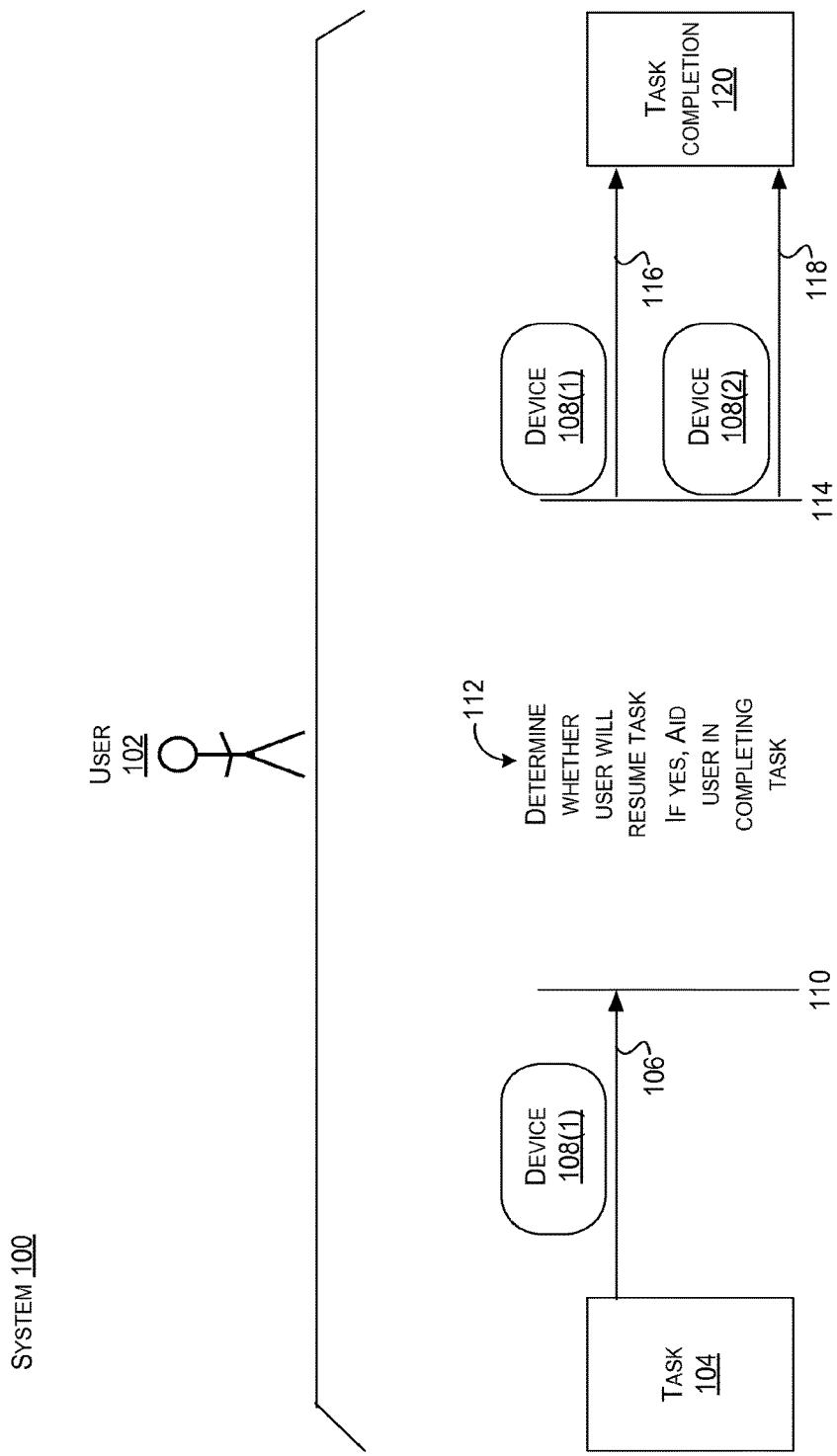
FIGS. 1-3 show examples of systems configured to aid in task completion in accordance with some implementations of the present concepts.

This patent relates to assisting a user to complete a task. For introductory purposes, consider FIG. 1 which shows a task assistance system 100. The system 100 relates to a user 102. The user works on a task 104 as indicated by arrow 106. At this point, the user is working on task 104 on computing device 108(1). In this instance, the user stops working on the task at point 110. At 112, the system can make a determination whether the user will resume the task. In some cases, the user can provide an express indication that the user will resume the task. For instance, the user could select an icon that says 'task incomplete—will resume later'. In other cases, the user may not provide any indication whether he or she will resume the task. In these cases, the determination can entail a prediction whether the user is likely to resume the task. The system can utilize various factors or parameters to generate the prediction. Briefly, the parameters can relate to previous user actions, time, etc. Examples of such parameters are described below relative to FIG. 2.

If a determination is made that the user is likely to resume the task, the system can aid the user in completing the task. For instance, the system can expend resources on behalf of the user to have results waiting for the user on resumption of the task. Other ways in which the user can be aided in completing the task are described below relative to FIG. 2 and FIGS. 4-6.

At point 114, the user can resume the task on device 108(1) as indicated by arrow 116 or on device 108(2) as indicated by arrow 118. The user can complete the task at 120. The present concepts can make it easier for the user to complete the task than would otherwise be the case.

Figure 2:
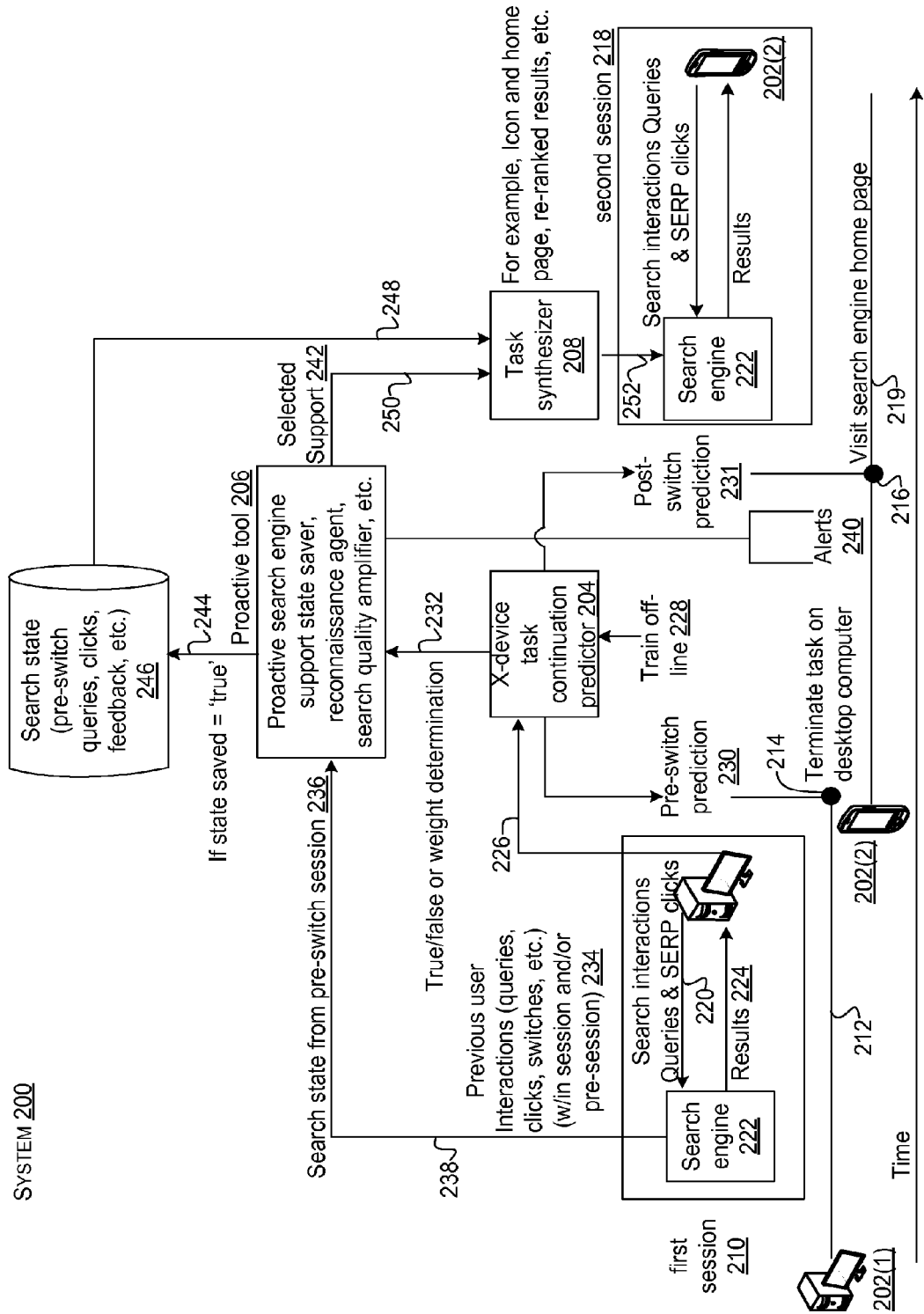

FIG. 2 shows another task assistance system 200 that includes a first computing device 202(1) and second computing device 202(2). Task assistance system 200 also includes a cross-device task continuation predictor 204, a proactive tool 206, and a task synthesizer 208. This system 200 relates to a specific scenario introduced in FIG. 1. This scenario involves a user utilizing first computing device 202(1) to start a task and second computing device 202(2) to finish the task. In this example, the task is a web search task. In this case, the first computing device can be manifest as a notebook or desktop computer. The second computing device 202(2) can be manifest as a smart phone or other computing device.

The user engages in the web search task in first session 210 on the first computing device 202(1). The user may resume the web search task on second computing device 202(2). In this example, the first computing device 202(1) can have a relatively large user display when compared to the second computing device 202(2). In other implementations, the display areas of the first and second computing devices may be equal, or the second computing device may have a larger display area. Of course, while relative screen size is discussed here, the computing devices may have differences in other device capabilities, such as processing power, memory/storage, network bandwidth, input devices, etc.

In the illustrated case, during the desktop session 210, the user works on the task as indicated by line 212. The user terminates the task at point 214 without completing the task. The user may or may not resume (designator 216) the task during a subsequent second or mobile session 218 on the second computing device 202(2). If the user does resume the task at 216, progress on the task is represented on line 219. The task assistance system 200 can utilize various prediction parameters to try to predict whether the user will resume the task. In the event that the prediction indicates that the user is likely to resume the task, the task assistance system 200 can take various actions to aid the user. These two aspects are discussed below. Note that the functionality provided by task assistance system 200 can involve multiple parallel dynamic feedback loops. As such, the order in which the components and processes are introduced is somewhat arbitrary and the system can be better appreciated at the conclusion of the description.

Some prediction parameters can relate to the first session (e.g., desktop session) 210. For instance the parameter can include search interactions, queries, and search engine results page (SERP) clicks 220 between the user and a search engine 222. Another prediction parameter can relate to results 224 provided by the search engine 222 responsive to the search interactions, queries and SERP clicks 220. These prediction parameters can be sent to cross-device task continuation predictor 204 as indicated at 226. The performance of the cross-device task continuation predictor 204 can be enhanced in some implementations through the use of off-line training as indicated at 228. A pre-switch prediction 230 can relate to a likelihood that the user will resume the search on the second computing device 202(2). Briefly, the pre-switch prediction 230 can be a binary prediction (e.g., true/false) or a percent likelihood (e.g., weighted determination). The cross-device task continuation predictor 204 can also make a post switch prediction 231. Pre and post switch predictions are described below.

The pre-switch prediction 230 can also be supplied to proactive tool 206 as indicated at 232. The proactive tool 206 can include a proactive search engine support state saver, a reconnaissance agent, and/or a search quality amplifier, among others. The proactive tool 206 can also receive input from previous user interactions 234 with computing device 202(1) (and/or other computing devices). In this example, the previous user interactions 234 can include a search state from pre-switch session 236. The search state from pre-switch session 236 can be supplied to the proactive tool as indicated at 238.

The proactive tool 206 can use the pre-switch prediction 230, the search state from pre-switch sessions 236, and/or alerts 240, among others, as input parameters. The proactive tool can determine a selected support action (e.g., selected support 242) to take based upon the input parameters. If the selected support utilizes the state of the first computing device 202(1) (e.g., desktop computer device) then the proactive tool 206 can cause the state to be saved. In the illustrated case, a save state condition is true at 244. As such, the proactive tool can save the task state (in this case the search state at 246). The saved search state 246 and the selected support 242 can be supplied to task synthesizer 208 as indicated at 248 and 250, respectively.

The task synthesizer 208 can utilize the saved search state 246 and the selected support 242 to prepare for user resumption of the search task (resume 216). For example, task synthesizer 208 can access search engine 222 as indicated at 252. The task synthesizer can refine the user search and/or expend other resources on behalf of the user to speed up the user's subsequent search, make the search easier, and/or make the search more productive.

Now that the elements of task assistance system 200 have been introduced another explanation is provided below. Viewed from one perspective, system 200 shows an architecture block diagram of the cross-device support for desktop to mobile prediction. In the example, the user starts their task on the first computing device 202(1) (e.g., desktop PC) as indicated by line 212. Subsequently, the user terminates (at 214) the task on the first computing device and resumes (at 216) the task on his/her second computing device 202(2) (e.g., mobile device) as indicated by line 219.

The cross-device task continuation predictor 204 can make various predictions relating to whether the user will resume the task. The continuation predictor can make the predictions at any point between task termination and task resumption. In the illustrated configuration the continuation predictor makes predictions at two points. The first point is immediately (shortly) after the user stops searching on his/her first computing device 202(1) (e.g., once the user closes the browser or logs-off the machine). This is termed the pre-switch prediction 230. The second point occurs once the user starts to search on the second computing device 202(2) by visiting the search engine homepage (e.g., post-switch prediction 231). The cross-device task continuation predictor 204 can pass its prediction (binary or weighted) plus optionally, the features and their weights, to the proactive tool 206. As noted above, the predictions are not limited to the types of predictions and/or points in time at which the predictions occur in the illustrated example.

The proactive tool 206 can decide what action to perform. In some cases, a single action can be performed. In other cases, the proactive tool 206 could decide between a set of actions based on the classifier confidence and the feature weights. This could be a machine-learned model or weights/rules could be set manually by search engine designers. If the selected action entails future access to the user's search state, then the search state can be committed to a data store (memory or disk-based) 246. When the user starts searching on the post-switch device (e.g., the second computing device 202(2)), the task synthesizer 208 can take the selected support and the state if utilized, and can determine what the search engine should do. For instance, the task synthesizer 208 could decide to add links/buttons to a homepage, bias autocomplete suggestions, incorporate results found by the system 200 during the background (between-devices) searching, etc. The task assistance system 200 can also show alerts 240 to the user on the second computing device 202(2) during the downtime between search sessions. The alerts 240 can provide the user with real-time updates on search progress. The alerts can also prompt the user to return to the search engine earlier than may otherwise be the case.

Note that information about the computing devices can also be useful in determining how to help the user. For instance, a desktop to mobile device switch can have different ramifications than a mobile device to desktop switch. For example, in many cases, desktop to mobile device switches are induced by time constraints (e.g., the user has to go somewhere and cannot take the desktop with them and so the user switches to the mobile device). In that case, the mobile device tends to have much less screen space and a more rudimentary input device. As such, prepopulating content to reduce user input on the mobile device can be very valuable to the user. Further, using location and/or direction of travel information (among others) from the mobile device can provide a valuable filter for the results so that user entry and selection on the mobile device is further reduced. For example, assume that the user entered "hit movies" on the desktop and then had to leave before finishing the search task.

The cross-device task continuation predictor 204 can make a prediction that the user is likely to resume the task on another (e.g., second) computing device 202(2). The proactive tool 206 can start to refine the search for the user based upon past user interactions. For example, the proactive tool may refine the search to find movie theaters playing hit movies. Once the user starts to utilize the mobile device, the proactive tool can further refine the search to find the movie theaters that are close to the location of the mobile device and emphasize those movie theaters that are in the direction that the user is moving with the mobile device. For instance, if the user is moving North with the mobile device, such as in a car or bus, the proactive tool can use this information to present a movie theater that is five miles to the North of the user over another movie theater that is five miles to the South of the user. In the opposite scenario where the user switches from the mobile device to the desktop, the user may be switching because they are in proximity of their desktop and can utilize its (potentially) superior user interface and input devices. In such a case, the proactive tool may re-establish the state of the user search on the mobile device so that the user can immediately resume the search task on the desktop.

Further, the proactive tool 206 can utilize the previous user interactions 234 to determine which types of tasks the user is likely to resume when switching in each direction. For instance, the user may be likely to resume an email task when switching both ways, desktop to mobile device or mobile device to desktop. However, the user may be likely to resume a document creation task when switching from mobile device to desktop to take advantage of the display area and input devices of the desktop. However, the user may not be likely to resume the document creation when switching from desktop to mobile device. Instead, past experience could indicate that the user waits until getting back to the desktop. Alternatively, the user may not tend to resume the document creation task on the mobile device, but may tend to resume once the user gets to their office on his/her work computer. As such, the task resumption concepts can involve more than two devices.

Task resumption may not go from device to device in a serial fashion or it may skip devices. In the above example, the user may not finish the document creation task on their home desktop, and may use their mobile device on the bus ride to work, but may not resume the document creation task until they log on to their work computer. The present concepts can make such a prediction. In that case, the proactive tool 206 may not take any action to present the document on the mobile device, but may present the document to the user upon login to their work computer.

Cross-device task continuation predictor 204 can utilize predictive models to make its predictions 230 and 231. The predictive models can leverage behavioral, topical, geospatial, and/or temporal features, among others derived from the current user's search history and/or in the aggregate across all searchers.

The post-switch prediction 231 can be investigated in an instance where the user does in fact resume the task on the post switch device. For example, once the user visits the homepage of the search engine on the second computing device 202(2), cross-device task continuation predictor 204 can predict that the user is going to resume the last task attempted on the first computing device 202(1). Some implementations can make post-switch predictions 231 at two points. The first point can occur when the user visits the search engine homepage on the second computing device 202(2). The second point can occur once the user has entered the first query on the second computing device (but before providing the results).

The proactive tool 206 can identify candidate features for the predictive models by characterizing existing cross-device task transitions utilizing the previous user interactions 234. For example, the proactive tool can identify patterns in device transitions and explore the temporal, geospatial, and topical aspects of cross-device searching.

The task synthesizer 208 can leverage the predictions of task resumption to help searchers perform cross-device searching at different points in the device switch. Search engines can offer help at two particular points, among others. The first point can occur immediately following the session on the pre-switch device (e.g., proactively retrieve task-relevant content). The second point can occur upon the user visiting the search engine homepage on the post-switch device (e.g., provide users with the option to resume their previous task).

In summary, web searchers frequently transition from desktop computers and laptops to mobile devices, and vice versa. Little support is provided for cross-device search tasks, yet they represent a potentially important opportunity for search engines to help their users, especially those on the target (post-switch) device. If the cross-device task communication predictor 204 can predict in advance that the user is going to resume their current search task on a different device with the next query, it could offer a range of support to help users resume their task on the post-switch device. For example, the proactive tool 206 could save the current session and re-instate it after the switch (e.g., show previous searches on the search engine homepage on the post-switch device. Alternatively or additionally, the proactive tool 206 could leverage pre-switch behavior as search context for queries issued on the post-switch device). In still another case, the proactive tool 206 could capitalize on down-time between devices to proactively retrieve novel or more relevant content on behalf of the searcher in the background while they are engaged in other tasks such as walking to the bus stop, where they will then resume their search task.

Note that while FIG. 2 explains in detail a scenario where the user task involves a search task, the concepts can be applied to other types of user tasks.

Figure 3:
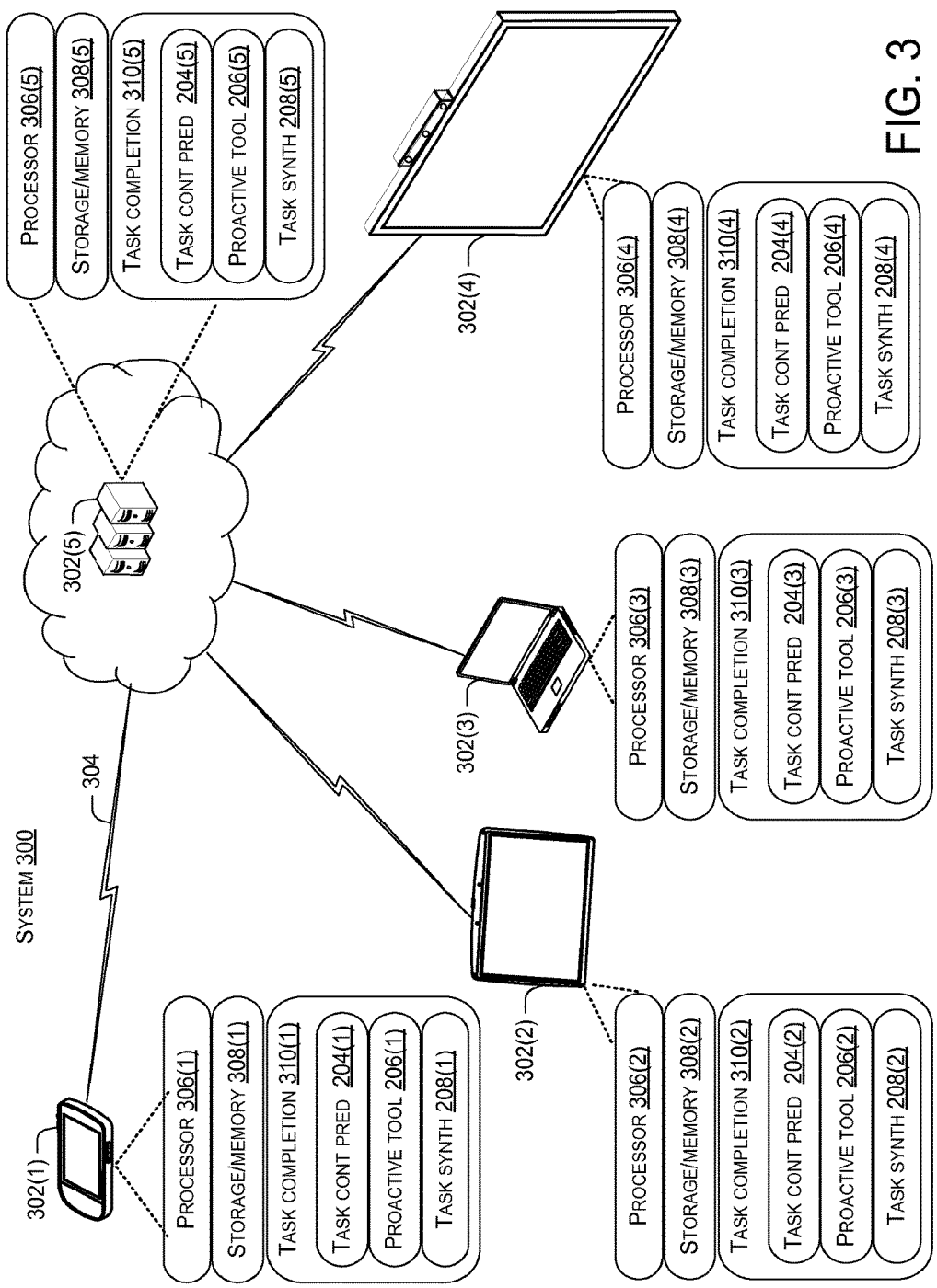

FIG. 3 shows another system 300 that can enable the task assistance concepts described above. Further, system 300 can include multiple devices 302. In this case, device 302(1) is manifest as a smart phone and device 302(2) is manifest as a tablet type computer. Similarly, device 302(3) is manifest as a notebook computer, device 302(4) is manifest as an entertainment device, and device 302(5) is manifest as server computer, such as a cloud based server computer. (In this discussion, the use of a designator with the suffix, such as "(1)", is intended to refer to a specific device instance. In contrast, use of the designator without a suffix is intended to be generic). Of course, not all device implementations can be illustrated and other device implementations should be apparent to the skilled artisan from the description above and below.

Devices 302 can communicate over one or more networks represented by lightning bolts 304. The devices 302 can include several elements which are defined below. For example, these devices can include a processor 306, storage/memory 308, and/or a task completion component 310. The task completion component 310 can include cross-device task continuation predictor 204, proactive tool 206, and/or task synthesizer 208. The devices 302 can alternatively or additionally include other elements, such as input/output devices (e.g., touch, voice, and/or gesture), buses, graphics cards, wireless circuitry, cellular circuitry, GPS circuitry, etc., which are not illustrated or discussed here for sake of brevity.

In some configurations, task completion component 310 can be installed as hardware, firmware, or software during manufacture of the device 302 or by an intermediary that prepares the device for sale to the end user. In other instances, the end user may install the task completion component 310, such as in the form of a downloadable application.

The term "device", "computer", or "computing device" as used herein can mean any type of device that has some amount of processing capability and/or storage capability. Processing capability can be provided by one or more processors (such as processor 306) that can execute data in the form of computer-readable instructions to provide a functionality. Data, such as computer-readable instructions, can be stored on storage, such as storage/memory 308, that can be internal or external to the computer. The storage can include any one or more of volatile or non-volatile memory, hard drives, flash storage devices, and/or optical storage devices (e.g., CDs, DVDs, etc.), among others. As used herein, the term "computer-readable media" can include signals. In contrast, the term "computer-readable storage media" excludes signals. Computer-readable storage medium/media includes "computer-readable storage devices." Examples of computer-readable storage devices include volatile storage media, such as RAM, and non-volatile storage media, such as hard drives, optical discs, and flash memory, among others.

Examples of devices can include traditional computing devices, such as servers, personal computers, desktop computers, notebook computers, cell phones, smart phones, personal digital assistants, pad or tablet type computers, mobile devices, wireless devices, cameras, routers, or any of a myriad of ever-evolving or yet to be developed types of computing devices. A mobile computer or mobile device can be any type of computing device that is readily transported by a user and may have a self-contained power source (e.g., battery). Similarly, a wireless device can be any type of computing device that has some capability to communicate with other devices without being physically connected to them.

In the illustrated implementation, devices 302 are configured with a general purpose processor 306 and storage/memory 308. In some configurations, a device can include a system on a chip (SOC) type design. In such a case, functionality provided by the device can be integrated on a single SOC or multiple coupled SOCs. One or more processors can be configured to coordinate with shared resources, such as memory, storage, etc., and/or one or more dedicated resources, such as hardware blocks configured to perform certain specific functionality. Thus, the term "processor" as used herein can also refer to central processing units (CPUs), graphical processing units (CPUs), controllers, microcontrollers, processor cores, or other types of processing devices suitable for implementation both in conventional computing architectures as well as SOC designs.

Note that some implementations can utilize information about a device, such as location information. Any such information gathering can be conducted in a manner that protects the security and privacy of the user. The user can be given notice of the use and allowed to opt-in, opt-out, and/or define such use. In any event, the present implementations can be accomplished in a manner that utilizes the information in a very targeted manner that limits the use of the information to accomplishing the present task completion concepts.

In some configurations, individual devices 302 can have a fully functional or stand-alone task completion component 310. For instance, device 302(1) can have a task completion component 310(1) that includes cross-device task continuation predictor 204(1), proactive tool 206(1), and task synthesizer 208(1) such that device 302(1) can perform all of the functionality described relative to FIG. 2. In an alternative configuration, device 302(1) could include a less robust task completion component 310(1) that includes a cross-device task continuation predictor 204(1). In this latter case, the task completion component 310(1) may communicate predictions from the cross-device task continuation predictor 204(1) to another device, such as device 302(5). The device 302(5) could include a task completion component 310(5) that is configured to utilize the predictions to operate on the user's behalf in an instance where the user resumes the task at a subsequent point and/or on a subsequent device 302.

Still another configuration can be thought of as a server-based configuration. In that configuration, device 302(5) can include a robust task completion component 310(5). Device 302(5) can support user functionality that the user can access from other devices 302(1)-302(4). The other devices 302(1)-302(4) can operate as thin clients that the user interacts with. In such a configuration, the user interacts with individual devices 302(1)-302(4) but some or all of the processing can be performed on device 302(5). In such a configuration, the task completion component 310(5) can provide task completion features to the user that are available from whatever device (or devices) the user utilizes.

In summary, system 300 includes components that can save a user task, such as a search or a document from one scenario to a second scenario. The first scenario can involve the user interacting with a first device. The second scenario can involve the user interacting with a second device. For example, the user may start a search session on the first device and leave the first device without finishing the search session (e.g., without completing a desired task). The user can resume the search session on the second device. In another case, the first scenario can be time based. For example, the user may stop a search session on the first device in a first scenario. After a period of time the user may return to the first device in a second scenario to finish the search task. The search can be saved and/or acted upon for the user in the interim to provide a more satisfying experience compared to the user simply restarting the search in the second scenario. At the end of the first scenario the user may indicate that he/she intends to continue the search. In other cases, the user may not give any indication, but a prediction can be made whether the user will resume the search.

Note that for ease of explanation, a single task is often discussed in the examples, however, the user may engage in multiple tasks concurrently (e.g., have multiple unfinished tasks at the same time). Strategies for handling task completion can be adapted to individual tasks and as such different tasks may be handled differently. For instance, while the task examples described above can be accomplished relatively quickly (e.g., completing a search task) other tasks may be relatively long term such that the tasks (and/or sub-tasks thereof) extend for relatively long periods of time. For instance, a user task may relate to planning a wedding or buying a house. The user may work on such a task for weeks or months and/or make multiple transitions involving multiple devices.

Figure 4:
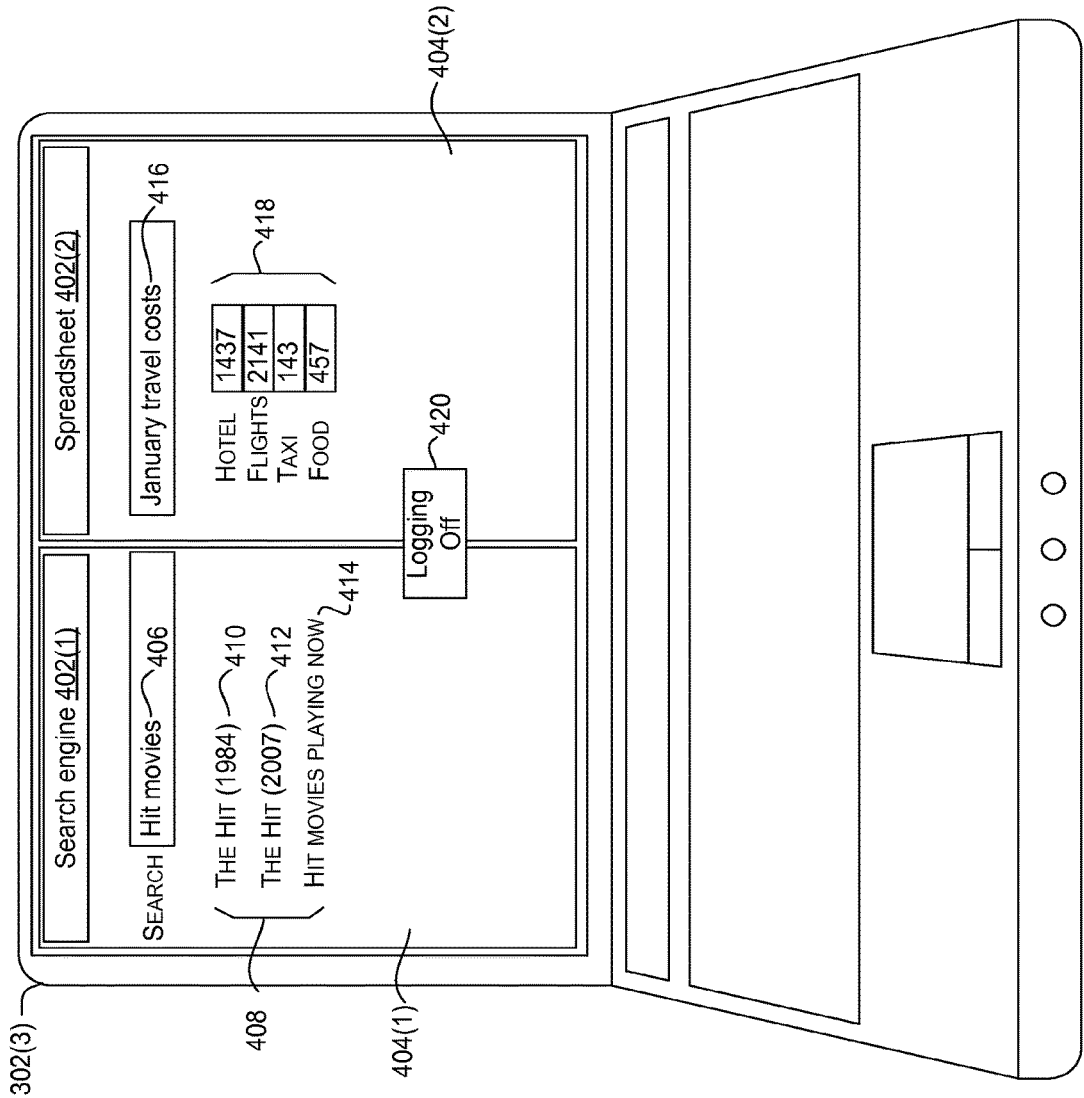
FIGS. 4-6 show examples of devices configured to aid in task completion in accordance with some implementations of the present concepts.
Figure 5:
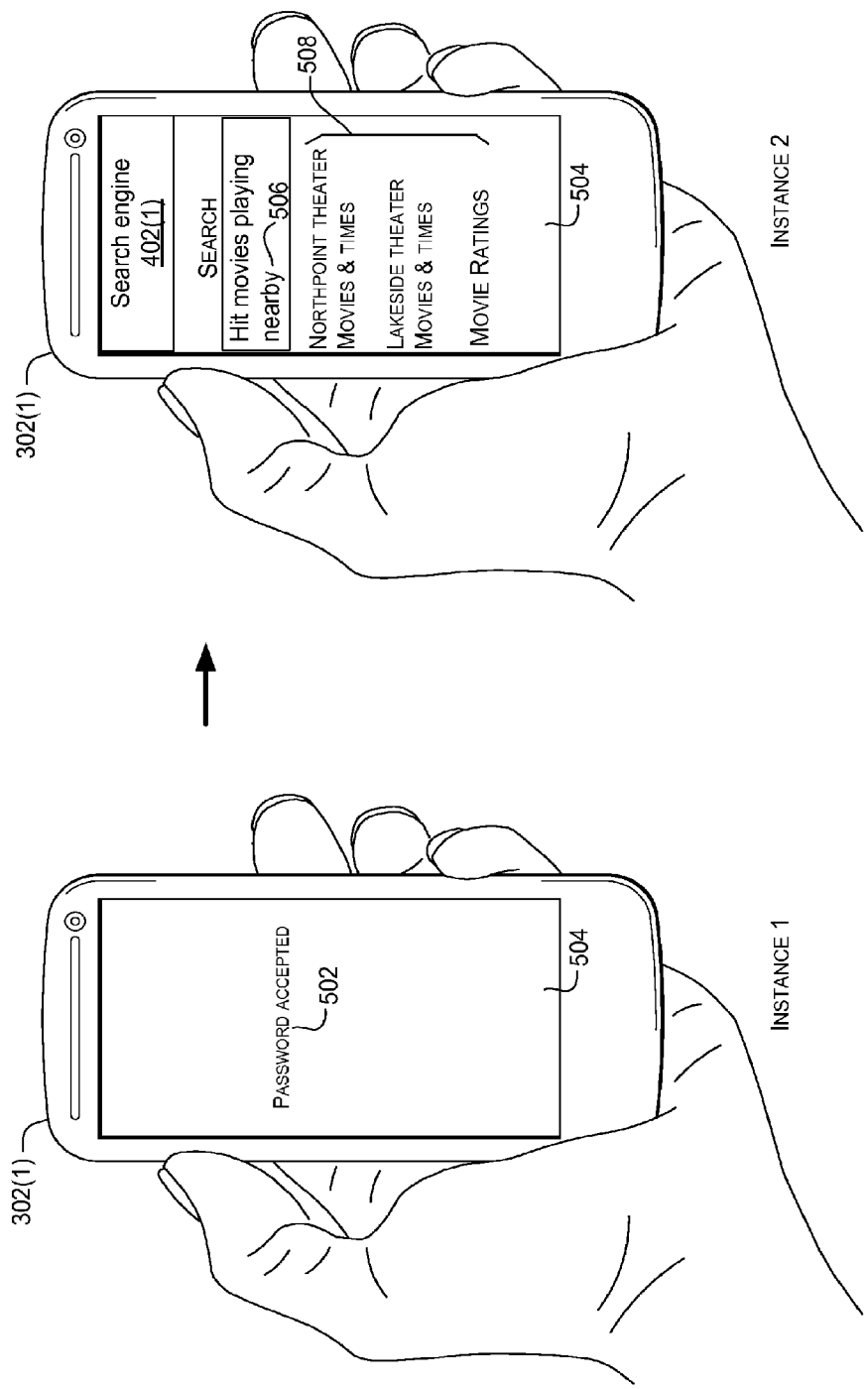
Figure 6:
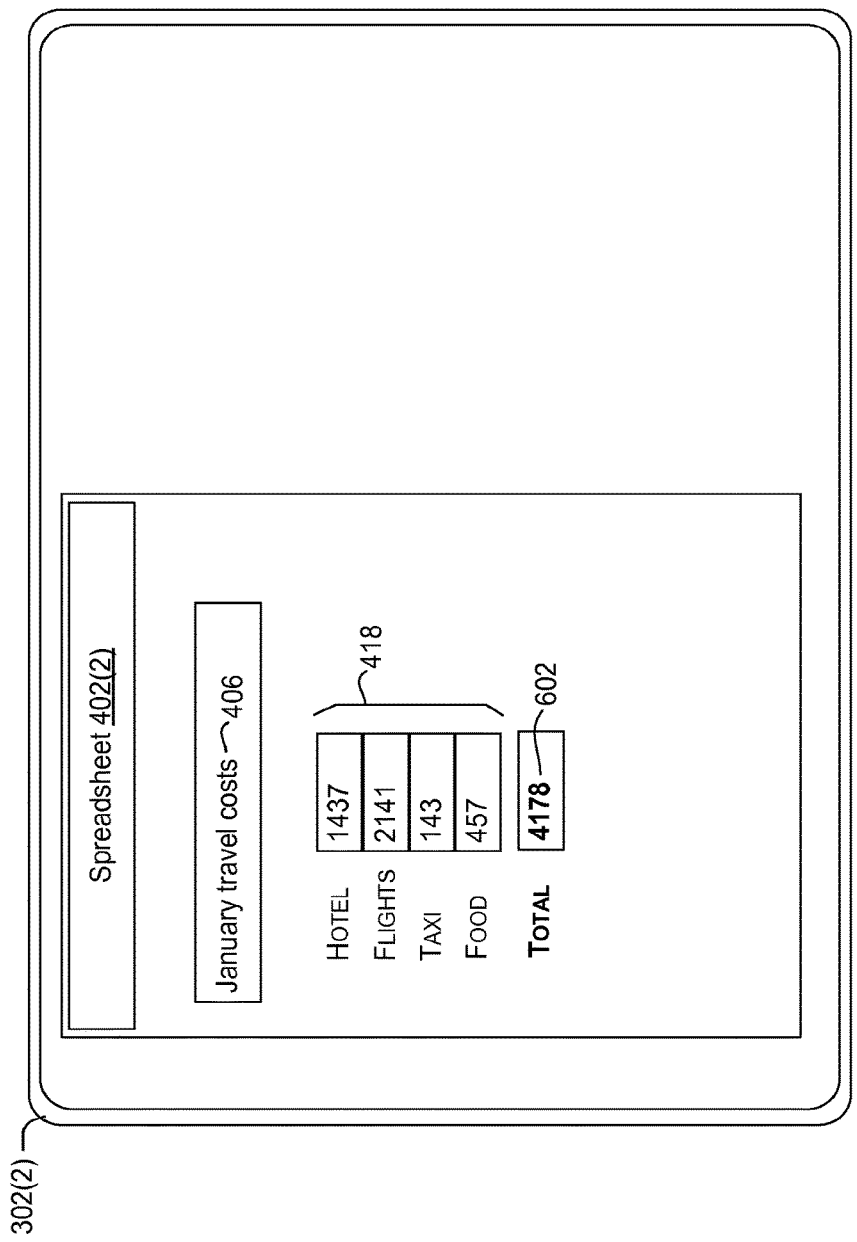

FIGS. 4-6 collectively relate to a 'multi-task' task completion scenario. In this example starting at FIG. 4, assume that the user is working on notebook computing device 302(3). For purposes of explanation, assume that the user is working on two applications. In this case, the first application can be a search engine (e.g., web browser application) 402(1) and the second application can be a document application (e.g., spreadsheet application 402(2)). A first GUI 404(1) relates to the first application and the second GUI 404(2) relates to the second application. On the first GUI 404(1), the user is searching the query term "hit movies" as indicated at 406. Results are shown generally at 408. The first result (e.g., highest ranked result) is the movie "The Hit (1984)" as indicated at 410. The second result is the movie "The Hit (2007)" as indicated at 412. The third result is "Hit movies playing now" as indicated at 414. Assume for purposes of explanation that these are not the results that the user wants and as such the task remains unfinished (e.g., incomplete).

Relative to the spreadsheet application 402(2), the user is calculating "January travel costs" as indicated at 416. The user has entered several values as indicated generally at 418. However, at this point, the user has not completed either the search task or the document task and yet is logging off from the computing device 302(3) as indicated at 420. For instance, assume that the user has to leave work to catch the bus home.

FIG. 5 shows first and second instances involving computing device 302(1). Instance 1 shows the user successfully logging into the computing device (e.g., "password accepted" at 502).

At instance 2 the search engine (e.g., browser application) 402(1) is automatically presented to the user on GUI 504. Alternatively, the user can launch the search engine (e.g., launch web browser and search engine). In either case, the task completion component 310 (FIG. 3) has predicted that the user is likely to resume this task. Further, the task completion component has taken actions on behalf of the user to aid in task completion. In this case, the task completion component has determined that the user likely wanted to search "hit movies playing nearby". As such, the task completion component has updated the search terms as indicated at 506 (compare designator 506 of FIG. 5 to designator 406 of FIG. 4). Accordingly, updated search results are indicated generally at 508 (compare designator 508 of FIG. 5 to designator 408 of FIG. 4). In this case, the highest ranking result is now "Northpoint Theater" with links to movies and times. The task completion component can take these actions on behalf of the user by learning from previous user actions as explained above relative to FIG. 2. The task completion component can also use information from the mobile devices, such as location and direction of travel. For instance, Northpoint Theater may be ranked higher than Lakeside Theater based upon the location and direction of travel of the user.

The task completion component 310 can also utilize other information, such as location information, day of the week information, time of day, etc. For instance, the user may have previously made similar searches on Friday evenings and the user may have started the present search on a Friday evening. Thus, the task completion component can make it much easier and simpler for the user to complete the search task and go to the movies. For example, the user can simply select "Northpoint Theater" to complete the task. In an alternative configuration, if the user's past history indicated that the user tends to purchase movie tickets online, the task completion component may progress into the Northpoint Theater website to present a "purchase tickets" link to the user to further reduce the actions that the user has to take to complete the task. In this case, the user did not have to enter any search terms on computing device 302(1) to complete the task. Thus, user convenience is enhanced in several ways, such as time and/or ease of input, among others.

FIG. 6 shows a subsequent time where the user is logged into his/her tablet computing device 302(2). For instance, the user may be using the tablet after the movies or the next day. In this case, task completion component 310 (FIG. 3) can predict that the user will resume the spreadsheet task on the tablet computing device. For instance, previous user actions can indicate that the user tends to resume search tasks on either his/her smart phone or tablet, but only tends to resume document tasks on the tablet. Such a scenario could occur where the user finds the display area and/or the input mechanisms of the smart phone to be satisfactory for search tasks, but inadequate for document tasks.

In this case, the task completion component 310 can predict that the user will resume the task on the tablet computing device 302(2) and take actions on behalf of the user to complete the task. In this example, the task completion component has utilized computing resources on behalf of the user in the intervening period between when the user stopped working on the task and when the user resumes the task. In this case, the spreadsheet application 402(2) includes the values 418 entered by the user on the notebook computing device 302(3) (FIG. 4). Further, the task completion component has utilized computing resources to calculate the total for the entries as indicated at 602. Thus, when the user resumes the spreadsheet task on the tablet computing device 302(2) actions have been taken to complete the task for the user (e.g., calculate the total). Of course, a relatively simple example is illustrated and discussed here for sake of brevity. The present concepts are applicable to more complex and/or different task completion scenarios.

To summarize, the present concepts can be applied to different types of tasks and/or across different types of computing devices in order to make task completion easier for the user.

Prediction Methods

As introduced above, the inventive concepts involve methods to learn accurate predictive models from data to predict contiguous task resumption across devices. Stated another way, the predictions can relate to the next task (or tasks) in the temporal sequence of user actions on his/her computing devices. Several implementations focus on contiguous tasks since those are resumed soon, affording the search engine the opportunity to help, rather than at some point in the next few days or week. Machine learning models can be utilized for these contiguous tasks. The machine learning models can use behavioral, topical, geospatial, and temporal features derived from data. One potential utility of these feature classes for the prediction task is determined by initial empirical analysis. Some models have strong predictive accuracy and can have direct implications for the development of tools to help people search more effectively in a multi-device world.

Data

The search activities of a user can be represented as a stream of temporally-ordered queries. Query streams can provide rich information about users' search interests and search tasks. In order to better capture the search intent of users, the concept of a search session can be employed to segment the query stream into fragmented units for analysis. Here, a typical search session can be defined using a 30-minute timeout to determine its boundaries in the stream. Of course, the 30 minute timeout value is provided for purposes of explanation. Other implementations could use other defined timeout values (e.g., defined time periods). For instance, timeout values from as short as a minute to more than an hour could be utilized.

A device switch can be defined as the act of moving between a pair of devices (e.g., personal computer→smartphone). In accordance with some implementations, a search session can consist of one or more queries, but this analysis does not permit a search session to span multiple devices. In other words, the queries within the same session occur on a single device. As a result, switching between devices involves at least two sessions, the pre-switch session and the post-switch session, in this implementation.

More precisely, let $Q=\{q_1, q_2, \ldots, q_i, \ldots, q_n\}$ be the query stream of a user, where $q_i$ is the i-th query in the stream. For each $q_i$ ($1 \leq i \leq n$), there is a 3-tuple $(t_i, s_i, d_i)$ associated with it, where $t_i$ is the timestamp of the query $q_i$, $s_i$ represents the session of $q_i$, and $d_i$ defines the device where $q_i$ has been issued. S is the personal search history comprising user search activity from Q in the time period before $s_i$. In this setting, cross-device search can be defined as follows:

DEFINITION: A cross-device search is represented as a 7-tuple, (S, $q_i$, $q_{i+1}$, $s_i$, $s_{i+1}$, $d_i$, $d_{i+1}$).

And in this implementation, the following conditions need to be satisfied: (1) $q_i$ is the last query in session $s_i$; (2) $q_{i+1}$ is the first query in session $s_{i+1}$; (3) $d_i$ and $d_{i+1}$ are two different devices.

The device-switching behavior can start at time $t_i$ and ends at time $t_{i+1}$. Define $q_i$ as the pre-switch query, $s_i$ as the pre-switch session, and $s_{i+1}$ as the post-switch session. One of the tasks that can be solved involves predicting whether the search task of $q_i$ will be resumed in the immediately-following post-switch session $s_{i+1}$, referred to as a contiguous cross-device task. All the queries in $s_{i+1}$ are defined as post-switch queries, and $q_{i+1}$ is the first query in the post-switch session. The following discussion shows that $q_{i+1}$ is most likely to be related to continuing the task of $q_i$ among all queries in the post-switch session. As previously defined, device-switching behavior can reveal very rich information about the user, including the individual device preferences for searching, the timespan and changing geo-location during the switch, and/or other switch-related session information.

Some implementations can focus on the switching between two devices. For instance, the first device can be a personal computer (PC) also referred to as "desktop" (note: the definition of desktops may also include laptops), and the mobile computing device (e.g., smart phone). To understand cross-device behavior, queries issued on both devices can be collected. Queries can be mined from the logs of both modalities separately and then joined using a persistent user identifier. For each query, its timestamp and geolocation can be recorded, allowing for temporal and geospatial characteristics to be studied.

Generating Features from Data

Given the behavioral data described in the previous section, aspects of the data can be mined corresponding to the following four characteristics, among others.

Behavioral: This aspect relates to the queries that users submit and their search behavior generally (e.g., number of search sessions, including their between device behavior (e.g., number of prior switches). Table 2 provides a more complete list of behavioral features. Note that although this discussion focuses on search queries, it is also possible to focus on the web pages and domains that users visit as an additional source of information for feature analysis.

Temporal: This aspect relates to the duration of the switch (the time between the pre- and post-switch queries) as well as when in the day switches tend to occur and the relationship between time-of-day and duration.

Geospatial: This aspect relates to the fact that one of the most common reasons for users to search on mobile is the limited mobility of desktop. One theory is that cross-device search may involve a change in location. In the analyzed dataset, geospatial information is available at city level (e.g., Seattle, Wash.) based on the same information from the internet providers on desktop and on the mobile device. Geospatial properties of the switching event (such as average speed during the switch) may help predict contiguous cross-device search tasks.

Topical: This aspect can be used to capture the users' search intent and construct models of their search tasks. This aspect can indicate how post-switch queries are affected by the topic of the pre-switch query. To do so, the sustainability of query topics can be analyzed during device switching.

Prediction Task

As stated earlier, a cross-device search can be defined by a 7-tuple, including the personal search history S, the pre-switch and post-switch queries $q_i$ and $q_{i+1}$, the pre-switch and post-switch sessions $s_i$ and $s_{i+1}$, and the devices used before and after the switch. Since the present detailed explanation focuses on the desktop-to-mobile switches, the definition could be simplified by excluding the device components.

Given a cross-device search, the implementations can predict whether the task of query $q_i$ is continued by any of the queries in the post-switch session $s_{i+1}$. Suppose the following Boolean function f can tell if two queries belong to the same task:

$$f(q_m, q_n) = \begin{cases} \text{True} & \text{if } q_m \text{ and } q_n \text{ belong to the same task,} \\ \text{False} & \text{else.} \end{cases}$$

Then the ground truth for the prediction will be:

$$\vee_{q_j \in s_{i+1}} f(q_i, q_j) \qquad (1)$$

Again, $q_i$ is the pre-switch query and $s_{i+1}$ is the post-switch session. By comparing $q_i$ with every query $q_j$ in the post-switch session and taking the OR operation with the results, the final ground truth for the cross-device search (S, $q_i$, $q_{i+1}$, $s_i$, $s_{i+1}$) can be obtained. One prediction task can therefore be to predict the result of function (1) using features extracted from (S, $q_i$, $q_{i+1}$, $s_i$, $s_{i+1}$).

The Choice of Function f

Function f measures the relevance between two queries in terms of searching tasks. One option is to ask human labelers to determine the relevance for every query pair. However, this approach may not be feasible for large-scale data.

In order to obtain the ground truth for all cross-device searches in the test dataset, this explanation can use a lightweight function f. Initially, randomly chosen pre- and post-switch query pairs can be manually labeled. A Support Vector Machine (SVM) classifier can be trained using the manual labels and features listed in table 1:

TABLE 1

| Name | Description |
| --- | --- |
| EditDistance | Editing distance between two queries |
| NumTermOverlap | Number of overlapping terms in two queries |
| QueryTermJaccard | Jaccard coefficient of two query term sets |
| IsSameQuery | Boolean, true if two queries are identical |
| IsSubsetQuery | Boolean, true if one query contains the other |

The trained SVM classifier can be used as function f. Five-fold cross-validation on function f against the human judgments can show that f is very accurate on the positive class and it can capture two thirds of related-query pairs.

Features

The device-switching process can be temporally segmented into five stages and design features accordingly. These five stages include: (1) User's searching history S; (2) Pre-switch session $s_i$; (3) Pre-switch query $q_i$; (4) The transition, time period from $t_i$ to $t_{i+1}$; (5) Post-switch session $s_{i+1}$. Table 2 lists examples of features for each stage.

TABLE 2

| Name | Description |
|---|---|
| Features from Search History S | |
| NumOfDesktopQuery | Number of queries issued on desktop |
| NumOfMobileQuery | Number of queries issued on mobile |
| PercentageDesktopQuery | Percentage of queries issued on desktop |
| PercentageMobileQuery | Percentage of queries issued on mobile |
| PercentageDesktopTime | Percentage of searching time on desktop |
| PercentageMobileTime | Percentage of searching time on mobile |
| NumOfSession | Number of search sessions |
| NumOfContiguousSwitch | Number of contiguous cross-device search tasks |
| NumOfRelevantCrossDevice | Number of search tasks appearing on both devices |
| EntropyAvg | Average device entropy of same-task queries |
| EntropySum | Total device entropy of same-task queries |
| EntropyWeighted | Weighted device entropy of same-task queries |
| Features from Pre-switch Session $s_i$ | |
| NumOfQuery | Number of queries within session $s_i$ |
| TimeSpanPreSess | Temporal length of session $s_i$ (in minutes) |
| NumOfLocationQuery | Number of location-related queries in session $s_i$ |
| AvgDistancePreSession | Average distance from current location to locations mentioned in session $s_i$ |
| Features from Pre-switch Query $q_i$ | |
| GlobalFrequency | The historical frequency of $q_i$ in the entire dataset |
| PersonalFrequency | The frequency of $q_i$ in personal search history S |
| NumExactQueryDesktop | Number of same queries as $q_i$ on desktop in S |
| NumExactQueryMobile | Number of same queries as $q_i$ on mobile |
| NumRelatedQueryDesktop | Number of related queries as $q_i$ on desktop |
| NumRelatedQueryMobile | Number of related queries as $q_i$ on mobile |
| NumExactQuerySwitch | Number of switches that pre-switch query and post-switch query are the same as $q_i$ |
| NumRelatedQuerySwitch | Number of switches that pre-switch query and post-switch query are both relevant to $q_i$ |
| PreQueryContiguousSwitch | Number of contiguous cross-device tasks of $q_i$ |
| NumOfRelatedQueryInSession | Number of queries relevant to $q_i$ in session $s_i$ |
| NumOfTerm | Number of terms in query $q_i$ |
| PreQueryCategory | The search topic of query $q_i$ |
| PreQueryHour | The hour component of $t_i$ |
| PreQueryDayofWeek | The day of week of $t_i$ |
| IsWeekday | Boolean, indicates $t_i$ is weekday or weekend |
| HasLocation | Boolean, true if $q_i$ contains location |
| PreQueryDistance | The distance from current location to location in $q_i$ |
| HasLocalService | Boolean, true if $q_i$ contains local service |
| Features from the Transition ($t_i$-$t_{i+1}$) | |
| TimeIntervalSwitch | The timespan between $t_i$ and $t_{i+1}$ |
| GeoDistanceSwitch | The distance between where $q_i$ and $q_{i+1}$ are issued |
| IsSameLocationSwitch | Boolean, true if $q_i$ and $q_{i+1}$ occur at the same place |

TABLE 2-continued

| Name | Description |
|---|---|
| AvgSpeedSwitch | Average travelling speed during the switch |
| Features from Post-switch Session $s_{i+1}$ | |
| TimeSpanPostSession | The temporal length of session $s_{i+1}$ |
| PostQueryCategory | The search topic of query $q_{i+1}$ |
| PostQueryHour | The hour component of $t_{i+1}$ |
| GeoDistancePostSession | The distance travelled within session $s_{i+1}$ |
| AvgSpeedPostSess | Average travelling speed within session $s_{i+1}$ |

Function f can be used to group queries into search tasks: Since function f is designed to judge the relevance of query pairs, f can be applied to every pair of queries in user's search history, and then cluster queries into groups. Each group of queries can represent a certain search task. By observing how the group of queries distributes on desktop and mobile, it is possible to compute entropy-based features and cross-device features.

Suppose $G_i$ is the i-th group in the user's search history, and it consists of k queries, $G_i = \{q_{i_1}, q_{i_2}, \ldots, q_{i_k}\}$. Among these k queries, l of them are issued on desktop and (k−l) queries are on mobile. Then the device entropy of $G_i$ is:

$$\frac{l}{k}\log\frac{k}{l} + \frac{k-l}{k}\log\frac{k}{k-l}$$

Not only entropy-based features are computed from query groups, some other cross-device-related features are also computed by grouping queries into search tasks first. The purpose is to capture the individual device preferences for different tasks. For example, the history feature NumOfRelevantCrossDevice counts the number of tasks spanning both devices; the pre-switch query feature NumRelatedQuerySwitch counts the number of contiguous cross-device searches on the tasks of $q_i$.

Training the Model

As mentioned above, the predictive model can be trained with labeled data. Labels for the prediction task can be obtained in two ways: automatic labeling and annotation by human labelers.

Automatic Labelling

Automatic task labeling can be applied to obtain labels for all the cross-device searches in a dataset. As mentioned above function f can be used to annotate the data.

Human Labeling

In some cases, human annotators can be utilized to label the cross-device searches in the dataset. For instance, given recent search history, the pre-switch query, and the post-switch session, human annotators can be asked to label every query in the post-switch session if it belongs to the same search task as the pre-switch query.

Applying the Model

The present concepts can support searchers performing cross-device searching at different points in the switch. As mentioned earlier, two points of interest can be defined as: (1) immediately following the session on the pre-switch device, and (2) on visiting the search engine homepage on the post-switch device.

Immediately Following Pre-Switch Session

Accurately predicting future task resumption at this point means that the search engine can perform actions on the users' behalf to (potentially) maximize the downtime between task termination and resumption. Examples of actions the search engine could do during this time are described above and below.

A first example of an action that can be taken before task resumption can include proactively saving recent session state into cloud server memory or disk cache for rapid access when the task is resumed. Tasks could be resumed via the search engine homepage or from any search engine result page. Recall that this aspect was described above relative to FIG. 2. In that discussion, search state from pre-switch sessions 236, Search interactions, queries and SERP clicks 220 and/or results 224 could be saved at 246.

A second example action can include trying different ranking algorithms that may be less efficient but more effective, or issue multiple related queries and blend or summarize the results. The search engine could also re-run recent abandoned queries, favoring quality over speed. Better quality results could be made available to searchers via alerts while mobile or via a link on the search engine homepage. Recall that in the discussion of FIG. 2, these actions can be accomplished by the proactive tool 206 and/or the task synthesizer 208.

Another example action can be starting a reconnaissance agent to proactively retrieve content from the Web that pertains to the user's current task. This new content could be made available to searchers via alerts while mobile or via a link on the search engine homepage, or any other viable means.

Still another example action could be posing the query to a question answering site such as Yahoo! Answers® (answers.yahoo.com), if the query is sufficiently descriptive to be posed as a question. If the user's intent is not sufficiently described, the search engine could prompt the user prior to departing the search engine on the pre-switch device to provide more information about their needs, perhaps even phrased as a natural language question for posting to community question-answering sites, social networks, etc. Recall that relative to the discussion of FIG. 2, these aspects can be accomplished by the proactive tool 206.

The predictive models can be valuable here because many of these actions are resource intensive and it can be advantageous from a resource perspective to not perform the actions for all queries. One alternative to the prediction is to provide users with a way to tell the system that they will resume soon. This can require an additional action from users, which they may forget or be unwilling to perform, and it may not always be clear to the user at termination time that resumption is likely. A combination of such a capability plus prediction may be beneficial to the user.

A further action example can involve a visit to a search engine homepage on the post-switch device by the user. The act of the user visiting the homepage can provide access to features about the transition between devices that can be useful in the task continuation prediction. Examples of support actions are described below.

One example of a supporting action at this point can be providing the user with the option to explicitly resume their task. Clicking on that option on the homepage would restore their state to that before the switch occurred, including marking pre-switch clicked result hyperlinks as visited and populating the recent query history with pre-switch queries.

Another supporting action can involve populating pre-switch queries in auto-completion drop-downs or automatically populate the search box on the homepage. Given that users have been observed to experience difficulty with typing on mobile devices, such support may speed up query entry.

Some implementations could also provide support on the basis of the queries on the post-switch device. This strategy could lead to even more accurate task-continuation prediction. Extending a mobile search session back to the immediately-preceding desktop session may help address the "cold start" problem of insufficient context to personalize early queries on mobile devices.

Beyond Prediction: Explicitly Indicating Task Resumption

Predictive models can reduce the burden on the user, but they can also be unreliable in some cases. An additional aspect that can be addressed involves searchers explicitly indicating to the search engine that they are going to resume the current search task on the post-switch device. This would serve as a reliable cue for the search engine to perform actions such as those described in the preceding section above. This could be implemented in the form of a "be right back" button displayed on the search engine homepage or any of the result pages. Additionally, the search engine could provide an option (button, link, etc.) on the homepage or any other search engine page on the post-switch device for searchers to explicitly indicate that they are resuming their pre-switch task. When selected, this would enable actions such as those described in the "On Visit to Search Engine Homepage on Post-Switch" section above.

Other Devices and Switching Directions

Note that although much of the discussion focuses on switches from desktop PCs to smartphones in this analysis, the concepts can be applied to any task resumption scenario relating to one or more devices. Switches can be in any direction between any two devices (laptops, tablets, slates, smartphones, e-readers, desktop PCs, etc.) and could even involve more than just device pairs if appropriate chaining is identified (e.g., a student could use a slate to take notes in class, a desktop PC to work on the assignment based on the notes, and a smartphone to converse with collaborators on the assignment and edit the document on the go).

The discussion above goes into substantial detail regarding specific implementations. Stepping back, the following methods convey some of the inventive concepts in a broader sense.

Figure 7:
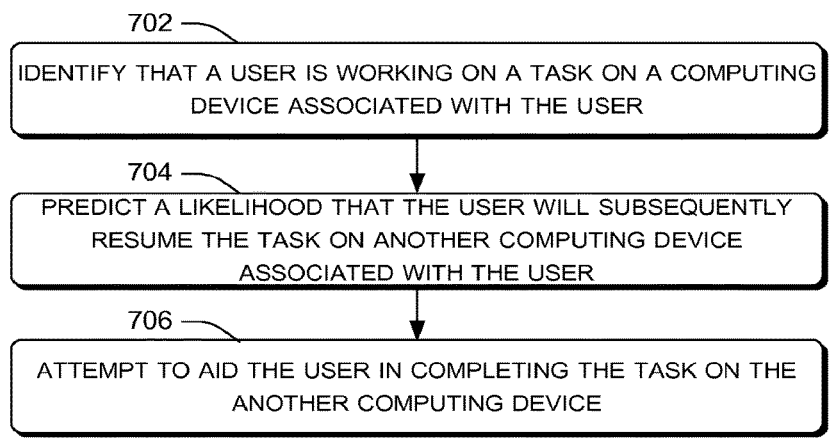
FIGS. 7-8 are flowcharts of examples of task completion techniques in accordance with some implementations of the present concepts.

FIG. 7 shows a method 700 for facilitating task completion.

The method can identify that a user is working on a task on a computing device associated with the user at 702. For instance, the user may be logged into the computer. The user can be performing the task on an application. The application can be stored on the device and running on the device. Alternatively, the application can be running remotely and presented on the computing device as a graphical user interface.

In some cases the user may stop working on the task without completing it. In such an instance when the user stops using the computing device without completing the task, the method can predict a likelihood that the user will subsequently resume the task on another (e.g., second) computing device associated with the user at 704. In some cases, the prediction can include detecting that the user logged-off of the computing device without completing the task. Such an occurrence can be an indicator that the user is likely to resume the task. In other cases, the prediction can include detecting continued use of the computing device by the user for other tasks after the user stops working on the task without completing the task. Such an occurrence can be an indicator that the user is not likely to resume the task.

In an instance where the likelihood exceeds a threshold the method can attempt to aid the user in completing the task on the second computing device at 706. The threshold can be an absolute threshold such that the threshold value is 1. Alternatively, the threshold can be a lower value, such as 0.75 for example. The method can attempt to aid the user in various ways. For instance, the method can automatically populate the task onto the second computing device. In cases where the task is a search task, the method can refine results of the search task prior to the user resuming the search task. The method can consider user interaction during previous user tasks to determine how to aid the user. For example, the attempting to aid can entail utilizing one or more computing resources on behalf of the user prior to the user resuming the task on the second computing device. Such configurations can allow time consuming activities to be performed for the user. The results of the time consuming activities can be presented when the user resumes the search. For example, the method could present the task to a human expert. Results received from the human expert could be presented to the user or utilized to further refine the task on behalf of the user.

Figure 8:
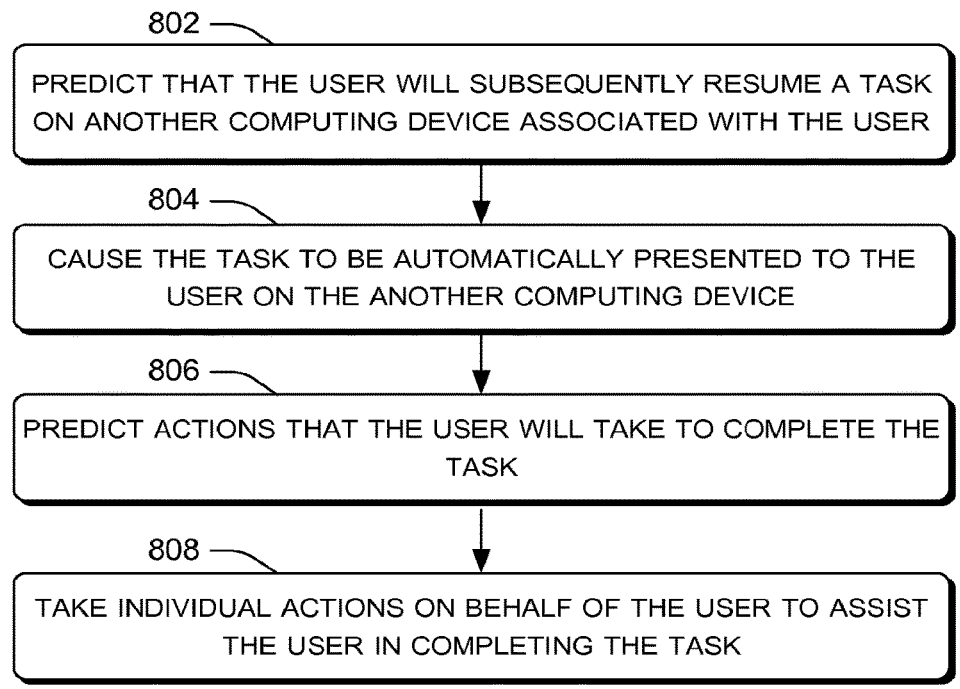

FIG. 8 shows a method 800 for facilitating task completion.

In some instances a user can be working on a task on a computing device associated with the user. The user may stop using the computing device without completing the task. In such a case, the method can predict that the user will subsequently resume the task on a second computing device associated with the user at 802.

The method can cause the task to be automatically presented to the user on the second computing device at 804.

The method can next predict actions that the user will take to complete the task at 806. The next or second prediction can be based upon user interactions on prior tasks.

The method can take individual actions on behalf of the user to assist the user in completing the task at 808. Thus, the method can aid the user in completing the task in a manner that is faster, easier, and/or more performant than would otherwise be the case.

The order in which the example methods are described is not intended to be construed as a limitation, and any number of the described blocks or acts can be combined in any order to implement the methods, or alternate methods. Furthermore, the methods can be implemented in any suitable hardware, software, firmware, or combination thereof, such that a computing device can implement the method. In one case, the method is stored on one or more computer-readable storage media as a set of instructions such that execution by a processor of a computing device causes the computing device to perform the method.

Conclusion

Although techniques, methods, devices, systems, etc., pertaining to task completion are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A system comprising:
one or more processors; and
one or more computer-readable storage media storing computer-readable instructions that, when executed by the one or more processors, cause the one or more processors to:
identify that a user is working on a task during a first session based at least on the user submitting a first search query to a search engine using a first computing device associated with the user;
predict that the user will subsequently resume the task on a second computing device associated with the user;
determine a second search query that the user is likely to submit upon resumption of the task on the second computing device;
begin processing the second search query before the user resumes the task on the second computing device; and
obtain search results for the second search query, the search results being based at least on a direction of movement of the second computing device.

2. The system of claim 1, the second search query being a refinement of the first search query.

3. The system of claim 2, the second search query including at least one search term that is not present in the first search query.

4. The system of claim 1, wherein the computer-readable instructions, when executed by the one or more processors, cause the one or more processors to:
rank the search results based at least on the direction of movement of the second computing device.

5. The system of claim 1, the one or more processors and the one or more computer-readable storage media being provided in a server computer that implements the search engine, wherein the computer-readable instructions, when executed by the one or more processors, cause the one or more processors to:
receive the first search query from the first computing device over a network;
detect that the first session has completed on the first computing device;
responsive to predicting that the user will subsequently resume the task on the second computing device, retain session state of the first session on the server computer after the first session has completed on the first computing device; and
utilize the retained session state to determine the second search query.

6. A method comprising:
identifying that a user is working on a task during a first session based at least on the user submitting a first search query to a search engine using a first computing device associated with the user;
determining a second search query that the user is likely to submit upon resumption of the task on a second computing device;
using computer resources to initiate processing of the second search query before the user resumes the task on the second computing device; and
obtaining search results of the second search query based at least on a location of the second computing device.

7. The method of claim 6, further comprising:
predicting whether the user will continue the task on the second computing device; and
initiating processing of the second search query responsive to a prediction that the user will continue the task on the second computing device.

8. The method of claim 7, further comprising:
using a trained classifier to perform the predicting.

9. The method of claim 8, further comprising:
training the classifier using labeled training examples of training queries that belong to the same search task and are performed on different computing devices.

10. The method of claim 6, further comprising:
prompting the user to return to the task on the second computing device; and
sending the search results to the second computing device in response to the user returning to the task.

11. The method of claim 6, performed by a server in network communication with the first computing device and the second computing device, the method further comprising:
 storing session state of the first session on the server in response to the user ending the first session on the first computing device; and
 restoring the session state, by the server, after the user resumes the task via a second session on the second computing device, wherein restoring the session state comprises populating a recent query history in the second session with at least some queries issued by the user during the first session.

12. A system comprising:
 a processor configured to provide a task completion component,
 the task completion component being configured to:
  identify that a user is working on a task based at least on the user submitting a first search query to a search engine using a first computing device associated with the user;
  determine a second search query that the user is likely to submit upon resumption of the task on a second computing device; and
  before resumption of the task on the second computing device, initiate processing of the second search query to identify search results of the second search query that are based at least in part on a location of the second computing device.

13. The system of claim 12, wherein the task completion component is further configured to:
 rank the search results based at least on the location of the second computing device.

14. The system of claim 12, wherein the task completion component is further configured to:
 rank the search results based at least on the location of the second computing device and a direction of movement of the second computing device.

15. The system of claim 12, wherein the task completion component is further configured to:
 an instance when the user resumes the task on the second computing device, send the search results of the second search query to the second computing device.

16. The system of claim 15, wherein the second search query comprises the first search query and at least one additional word.

17. The system of claim 1, wherein the computer-readable instructions, when executed by the one or more processors, cause the one or more processors to:
 send the search results to the second computing device.

18. The system of claim 17, wherein the computer-readable instructions, when executed by the one or more processors, cause the one or more processors to:
 detect that the user has resumed the task on the second computing device; and
 send the search results to the second computing device responsive to detecting that the user has resumed the task on the second computing device.

19. The system of claim 17, wherein the computer-readable instructions, when executed by the one or more processors, cause the one or more processors to:
 send the search results to the second computing device after the user visits a webpage of the search engine.

20. The system of claim 19, wherein the computer-readable instructions, when executed by the one or more processors, cause the one or more processors to:
 include the second search query and the search results on the webpage of the search engine.

* * * * *